J. R. WILLIAMS.
PIPE BENDER.
APPLICATION FILED APR. 25, 1908.
907,210.
Patented Dec. 22, 1908.
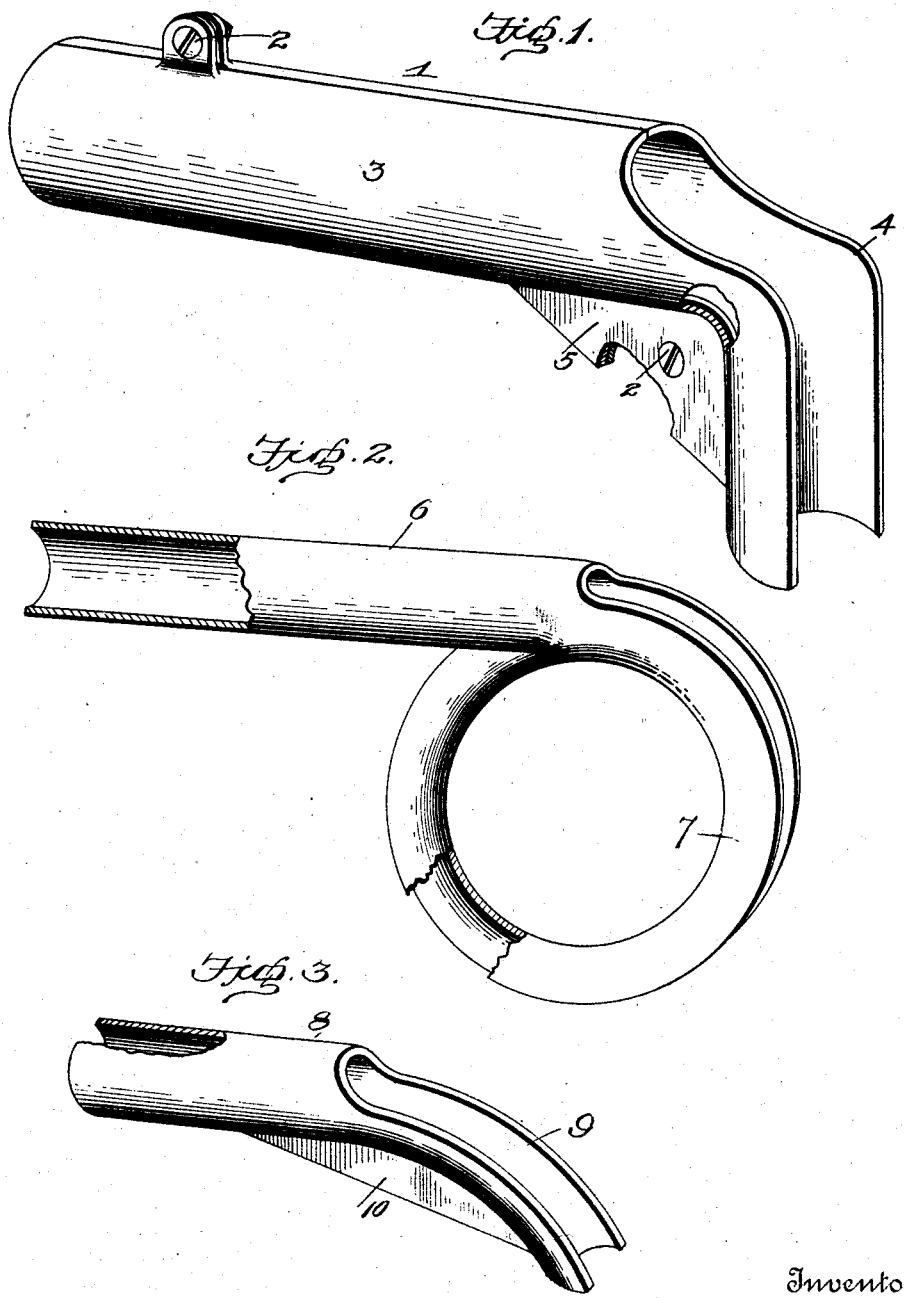
Witnesses
C. E. Hunt.
C. H. Griesbauer.
Inventor
J. R. Williams
By H. P. Wilson &co.
Attorneys

UNITED STATES PATENT OFFICE.

JOHN R. WILLIAMS, OF MILWAUKEE, WISCONSIN.

PIPE-BENDER.

No. 907,210.  Specification of Letters Patent.  Patented Dec. 22, 1908.

Application filed April 25, 1908. Serial No. 429,263.

*To all whom it may concern:*

Be it known that I, JOHN R. WILLIAMS, a citizen of the United States, residing at Milwaukee, in the county of Milwaukee and State of Wisconsin, have invented certain new and useful Improvements in Pipe-Benders; and I do declare the following to be a full, clear, and exact description of the invention, such as will enable others skilled in the art to which it appertains to make and use the same.

This invention relates to an improved pipe bender and the object thereof is to provide a simply constructed and efficient tube or mandrel for bending lead or iron pipes to form one or more angles therein.

With these and other objects in view, the invention consists of certain novel features of construction, combination and arrangement of parts as will be more fully described and particularly pointed out in the appended claim.

In the accompanying drawings, Figure 1 is a perspective view of one form of this improved device; Fig. 2 is a similar view of another form; and Fig. 3 is a similar view of another modification.

This improved bender may be made in one piece or in sections to be used as occasion demands according to the number of bends to be made in one piece of pipe. This bender may be made of any desired size and of any suitable material, preferably of malleable or gray iron and when used is placed in a vise.

In the embodiment illustrated in Fig. 1, a bending tool 1 is shown, comprising a tubular body member 3 composed of two longitudinally divided sections connected by screws as 2, which pass through apertured lugs and through brace members to be described. The pipe to be bent is adapted to be passed through this tubular member 3 and a grooved member 4 is arranged at one end of said member 3 and preferably extends at right angles to said tubular member and is strengthened by a suitable brace 5 which is preferably formed of two members one carried by each of the two sections and through which one of the screws as 2 is adapted to be passed to assist in fastening the members of the device together. The bender is designed to be made in sections, and secured together as above described, when a pipe having two or more bends therein is to be formed and the sections are made separable to permit the bender to be removed from the pipe after the bends have been formed therein.

In the form shown in Fig. 2 a tubular handle member 6 is shown having a grooved circular member 7 arranged at one end with the groove thereof forming a continuation of the bore of the tubular handle member 6. In the use of this device, the pipe is inserted through the bore of the tubular handle member 6 and by exerting pressure on the pipe it is caused to conform to the shape of the grooved member 7 and a bend of any desired angle may be formed in said pipe.

In the form shown in Fig. 3 a tubular member 8 is shown having a grooved extension 9 constructed in the form of an arc of a circle in which the pipe operated upon may be bent to an angle of ninety degrees or off-sets of any desired size may be made therein by the use of this form of bender. The brace 10 is arranged between said grooved member 9 and the handle member 8 to brace and strengthen the tool.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claim.

I claim as my invention:—

A pipe bender comprising a tubular body member having a trough-like extension, said body and said extension being divided longitudinally and separably connected to adapt the device for use on pipes having a plurality of bends therein.

In testimony whereof I have hereunto set my hand in presence of two subscribing witnesses.

JOHN R. WILLIAMS.

Witnesses:
 FRANK SCHWINN,
 W. E. GITTIN.